United States Patent
Cerovsky

(10) Patent No.: US 11,141,766 B2
(45) Date of Patent: Oct. 12, 2021

(54) HYDRAULIC EXTRUSION TOOL WITH INTEGRATED INDUCTION DEVICE

(71) Applicant: MTU Aero Engines AG, Munich (DE)

(72) Inventor: Florian Cerovsky, Garmisch-Partenkirchen (DE)

(73) Assignee: MTU Aero Engines AG, Munich (DE)

( * ) Notice: Subject to any disclaimer, the term of this patent is extended or adjusted under 35 U.S.C. 154(b) by 279 days.

(21) Appl. No.: 16/293,005

(22) Filed: Mar. 5, 2019

(65) Prior Publication Data

US 2019/0275575 A1 Sep. 12, 2019

(30) Foreign Application Priority Data

Mar. 6, 2018 (DE) ...................... 10 2018 203 274.2

(51) Int. Cl.
*B23P 19/04* (2006.01)
*B21C 25/08* (2006.01)
(Continued)

(52) U.S. Cl.
CPC .............. *B21C 25/08* (2013.01); *B21C 29/04* (2013.01); *B23P 6/00* (2013.01); *B23P 11/025* (2013.01);
(Continued)

(58) Field of Classification Search
CPC . B21C 25/08; B21C 29/04; B23P 6/00; B23P 19/04; B23P 19/027; B23P 11/025;
(Continued)

(56) References Cited

U.S. PATENT DOCUMENTS 4,167,259 A * 9/1979 Bury ...................... H05B 6/365
24/304
4,167,809 A 9/1979 Boyland et al.
(Continued)

FOREIGN PATENT DOCUMENTS

CN 101284354 A 10/2008
CN 204397307 U * 6/2015
(Continued)

OTHER PUBLICATIONS

Machine Translation of Yang; CN106563917A; Apr. 19, 2017 (Year: 2017).*

(Continued)

*Primary Examiner* — Ryan J. Walters
(74) *Attorney, Agent, or Firm* — Barlow, Josephs & Holmes, Ltd.; David Josephs

(57) ABSTRACT

The present invention relates to a hydraulic extrusion tool for extruding a rotor shaft for a turbomachine, and a corresponding method. The turbomachine has a structure that is fastened to the rotor shaft by a press fit. The extrusion tool has a first tool part that is configured for the purpose of being arranged on a first side of the structure, and which has a coupling mechanism that is configured for the purpose of coupling the first tool part to the structure, in such a way that the first tool part and the structure cannot move away from each other, at least in one direction along an axis of the rotor shaft; and an induction device that is configured for the purpose of heating the structure by induction in the region of the press fit.

5 Claims, 1 Drawing Sheet

(51) Int. Cl.
  *B21C 29/04* (2006.01)
  *B23P 19/027* (2006.01)
  *B23P 11/02* (2006.01)
  *B25B 27/04* (2006.01)
  *B25B 27/02* (2006.01)
  *B23P 19/02* (2006.01)
  *B23P 6/00* (2006.01)
  *F01D 5/02* (2006.01)

(52) U.S. Cl.
  CPC ........... *B23P 19/022* (2013.01); *B23P 19/027* (2013.01); *B23P 19/04* (2013.01); *B25B 27/026* (2013.01); *B25B 27/04* (2013.01); *B23P 19/025* (2013.01); *F01D 5/025* (2013.01); *F05D 2230/40* (2013.01); *F05D 2230/70* (2013.01); *F05D 2260/37* (2013.01); *Y10T 29/49318* (2015.01)

(58) Field of Classification Search
  CPC ...... B23P 19/022; B23P 19/025; B25B 27/04; B25B 27/026; Y10T 29/49318; F05D 2230/40; F05D 2230/70; F05D 2260/37; F01D 5/025
  See application file for complete search history.

(56) References Cited

U.S. PATENT DOCUMENTS

| | | | |
|---|---|---|---|
| 4,570,053 A | 2/1986 | Ades et al. | |
| 6,867,396 B2 * | 3/2005 | Haimer | H05B 6/14 |
| | | | 219/635 |
| 2012/0167388 A1 | 7/2012 | Black et al. | |

FOREIGN PATENT DOCUMENTS

| | | |
|---|---|---|
| CN | 106563917 A | 4/2017 |
| JP | H0852622 A | 2/1996 |
| RU | 2388584 C2 | 5/2010 |
| SU | 1256948 A1 | 9/1986 |

OTHER PUBLICATIONS

Publ.-Nr. WL 80 100/3 DA FAG Schäffler Firmenschrift S. 58, "Mounting bearings", FAG, 2013.
Katalog WL 80 250/4 DA, FAG "Devices and services for mounting and maintenance of rolling bearings, Inductive FAG heating devices", FAG, 2010.
"Inductive bearing heating", dp Prüftechnik, 2017.
"Solid induction heater", SKF, 2017.

* cited by examiner

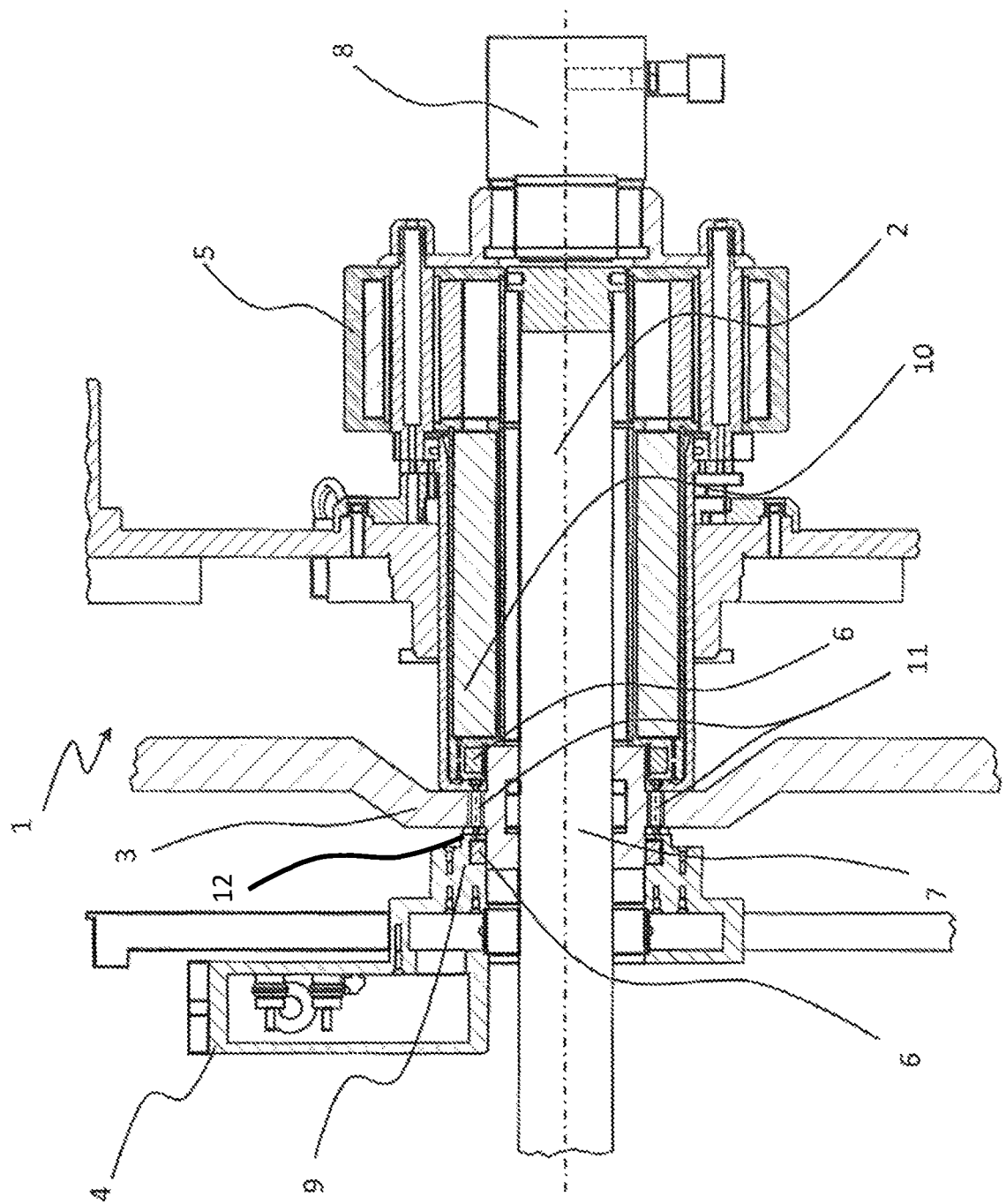

HYDRAULIC EXTRUSION TOOL WITH INTEGRATED INDUCTION DEVICE

BACKGROUND OF THE INVENTION

The present invention relates to a hydraulic extrusion tool for extruding a rotor shaft from a structure of a turbomachine, this structure being fastened to the rotor shaft by means of a press fit.

Structures of turbomachines are usually fastened by means of press fits to a structure of a rotor shaft of the turbomachine. The structure may have, for example, the form of a disk, in which a through-borehole is formed. The press fit is provided between an inner diameter of the through-borehole and an outer diameter of the rotor shaft. In order to detach the disk from the rotor shaft, a conventional extrusion tool has previously been employed. It has proven to be a disadvantage that, during the extrusion, both the rotor shaft and the disk may be damaged, since press fits have a very narrow tolerance.

It was previously considered to heat the inner diameter of the disk by means of a heating device, so that the disk expands and the rotor shaft can be easily pulled out. In this case, however, the rotor shaft is also heated, so that this method has not proven to be appropriate. To make matters worse, the previous extrusion tool does not offer suitable access for such heating devices.

Heating devices in the design of induction devices that are employed, for example, for mounting or dismantling roller bearings, are known. Examples therefor are found in the catalogs WL 80 100/3 DA "*FAG Montage von Wälzlagern*" [*FAG Mounting of Roller Bearings*] and WL 80 250/4 DA "*FAG Geräte and Dienstleistungen für Montage and Wartung von Wälzlagern*" [*FAG Equipment and Service for Mounting and Maintenance of Roller Bearings*], which were published by the Schäffler Group. In this case, the roller bearings are placed on hot plates or placed on inductively heated supports prior to mounting. For dismantling, an inductively heated drum can be employed, which is arranged around the roller bearing to be dismantled.

SUMMARY OF THE INVENTION

An object of one embodiment of the present invention is to improve the hydraulic extrusion of a rotor shaft from a structure of a turbomachine.

This object is achieved, respectively, by a hydraulic extrusion tool for extruding a rotor shaft from a turbomachine and by a method for hydraulically extruding a rotor shaft from a turbomachine of the present invention. Advantageous embodiments of the invention are discussed in detail below.

One aspect of the present invention relates to a hydraulic extrusion tool for extruding a rotor shaft from a turbomachine, wherein the turbomachine has a structure that is fastened to the rotor shaft by means of a press fit. The hydraulic extrusion tool has a first tool part that is configured for the purpose of being arranged on a first side of the structure, and which has a coupling mechanism that is configured for the purpose of coupling the first tool part to the structure, so that the first tool part and the structure cannot be moved relative to one another, at least in one direction along an axis of the rotor shaft; and at least one induction device that is configured for the purpose of heating the structure by means of induction in the region of the press fit; wherein the first tool part has an actuator, in particular, a hydraulically actuated actuator, that is configured for the purpose of pushing or pulling the rotor shaft out of the structure against the press fit, when an assembled state is present in which the first tool part is coupled to the structure. This configuration makes it possible to conduct the induction heat in a targeted manner onto the press fit without essentially heating the rotor shaft. Consequently, the rotor shaft can be pressed out from the structure without causing any damage to the structure or to the rotor shaft.

Preferably, the hydraulic extrusion tool has a second tool part that is configured for the purpose of being arranged at a second side of the structure, which is opposite to the first side, wherein the induction device is integrated in the second tool part. Preferably, another induction device is also integrated in the first tool part. In this way, the hydraulic extrusion tool can be compactly dimensioned, and the induction heat can still be conducted directly to the press fit.

Preferably, the coupling mechanism has a plurality of, in particular three or more, connection mechanisms, such as bolts, for example, and a ring, wherein the ring is arranged on the second side of the structure, and the connection mechanisms are coupled to the first tool part, and in the assembled state enter into complementary openings that are formed in the ring.

Preferably, the first tool part is configured for the purpose of being arranged at the structure, so that a plane is present that is perpendicular to the axis of the rotor shaft and intersects both the region of the press fit as well as the first tool part.

Preferably, the induction device is configured for the purpose of being positioned radially relative to the axis of the rotor shaft outside the region of the press fit when the assembled state is present, so that a plane is present that is perpendicular to the axis of the rotor shaft and intersects both the region of the press fit and the induction device. Preferably, the first and/or the second tool part(s) each have cylindrical section(s) in which the respective induction device is arranged. In this way, it is possible for the induction heat to be conducted directly into the region of the press fit.

Another aspect of the present invention relates to a method for hydraulically extruding a rotor shaft from a turbomachine, wherein the turbomachine has a structure in which the rotor shaft is fastened by means of a press fit. The method comprises steps for arranging a first tool part on a first side of the structure; coupling the first tool part to the structure in such a way that the first tool part and the structure cannot move relative to one another, at least in one direction along an axis of the rotor shaft; arranging at least one induction device in the region of the press fit; introducing a pressure, in particular a hydraulic pressure, onto an actuator in such a way that the rotor shaft is pushed or pulled out from the structure against the press fit; simultaneous heating of the structure in a region of the press fit by means of induction by the induction device. Preferably, a constant high pressure is introduced by the actuator, and simultaneously, heating is produced by the induction device. As soon as the press fit has expanded as a consequence of the heating, the rotor shaft pops out of the structure. By this method, the rotor shaft can be extruded from the structure more rapidly than in the prior art, since the extrusion and the heating take place simultaneously and no unnecessary cooling phases occur.

Preferably, the step for arranging the first tool part comprises a step for centering the first tool part.

BRIEF DESCRIPTION OF THE DRAWING FIGURES

Additional advantageous enhancements of the present invention can be taken from the dependent claims and the following description of preferred embodiments. For this purpose and partially schematized:

FIG. 1 shows a schematic representation of a hydraulic extrusion tool 1 according to one embodiment of the present invention.

DESCRIPTION OF THE INVENTION

FIG. 1 shows a schematic representation of a hydraulic extrusion tool 1 according to one embodiment of the present invention. The hydraulic extrusion tool 1 serves for hydraulically extruding a rotor shaft 2 from a turbomachine, wherein the turbomachine has a structure 3, in which the rotor shaft 2 is attached by means of a press fit. The rotor shaft 2 can be incorporated in a turbomachine, in particular a gas turbine, particularly an aircraft engine.

In the exemplary embodiment shown, the turbomachine involves a low-pressure turbine. The low-pressure turbine comprises a multi-stage turbine rotor, which comprises rotating disks bladed with rotor blades that are arranged behind one another axially, or when observed in the flow direction, relative to an axis of a turbine rotor, and are introduced on the rotor shaft 2 by means of the press fit. The rotating disks represent an example of the structure 3 according to the present invention, in which the rotor shaft 2 is fastened by means of the press fit.

The hydraulic extrusion tool 1 has a first tool part 5 that is configured for the purpose of being arranged completely or partially around the rotor shaft 2 on a first side of the structure 3. The hydraulic extrusion tool 1 further has a second tool part 4 that is configured for the purpose of being arranged completely or partially around the rotor shaft 2 on a second side of the structure 3, the second side being opposite to the first side.

The hydraulic extrusion tool 1 has a coupling mechanism 11, 12, which has a plurality of connection mechanisms 11, such as bolts, for example, and a ring 12, wherein the ring 12 is arranged on the second side of the structure 3, and the connection mechanisms 11 are coupled to the first tool part 5 and, in the assembled state, enter into complementary openings that are formed in the ring 12. In this case, the connection mechanisms 11 also pass through axial through-boreholes that are formed in the structure 3. Therefore, the first tool part 5 and the structure 3 are coupled together in such a way that they cannot move relative to one another, at least in one direction along an axis of the rotor shaft 2. In FIG. 1, the first tool part 5 and the structure 3 cannot be moved away from each other. The coupling mechanism 11, 12 may have also a plurality of centering mechanisms, such as, for example, three or more centering pins (not shown), by which the first tool part 5 can be centered.

The first and the second tool parts 5, 4 each have an induction device 6 that is configured for the purpose of heating the structure 3 by means of induction in the region 7 of the press fit. The induction devices 6 are formed by one or a plurality of electrical induction coils. The induction coils can be designed so that they completely surround the rotor shaft 2. Alternatively, the induction coils can be formed from a plurality of coil segments arranged in the peripheral direction. The induction devices 6 are each integrated in the first and the second tool parts 5, 4. In particular, the first and the second tool parts 5, 4 each have cylindrical sections 10, 9, in which is found the induction device 6. It is shown in FIG. 1 that the induction devices 6 are arranged at a distal end of each of the cylindrical sections 10, 9, so that they lie opposite to each other. In this way, the induction devices 6 in the first and second tool parts 5, 4 are optimally adapted to pre-determined layouts of existing turbomachines.

The induction devices 6 are configured for the purpose of being able to be positioned radially relative to the axis of the rotor shaft 2, outside the region 7 of the press fit, so that planes are present that are perpendicular to the axis of the rotor shaft 2 and intersect both the region 7 of the press fit and the induction devices 6. In this way, the induction devices 6 are found in the vicinity of the press fit and can conduct the induction heat there in a targeted manner.

It is further shown in FIG. 1 that the first tool part 5 is configured for the purpose of being arranged at the structure 3, so that a plane is present that is perpendicular to the axis of the rotor shaft 2 and intersects both the region 7 of the press fit and the first tool part 5. In this case, the radial distance between the connection mechanism and the press fit should be as small as possible. In this way, tilting moments that could affect the structure 3 when the rotor shaft 2 is pulled out can be minimized.

The first tool part 5 has a hydraulically actuated actuator 8 that is configured for the purpose of pressing the rotor shaft 2 out from the structure 3 against the press fit, when an assembled state is present in which the first tool part 5 is coupled to the structure 3. As soon as the induction devices 6 have sufficiently heated the region 7 of the press fit and the press fit has been expanded, the rotor shaft 2 pops out from the structure 3.

The operation of the hydraulic extrusion tool 1 is as follows: In a first step, the first tool part 5 is arranged around the rotor shaft 2 on the first side of the structure 3. The second tool part 4 is arranged around the rotor shaft 2 on the second side of the structure 3, the second side being opposite the first side.

In the next step, the first tool part 5 and the structure 3 are coupled to one another in such a way that the first tool part 5 cannot move away along the axis of the rotor shaft 2 (to the right in FIG. 1). In this case, the bolts 11 are screwed into the complementary openings of the ring 12. At the same time, the first and/or the second tool part(s) 5, 4 can be centered relative to each other by the (not shown) centering pins. This function can be realized alternatively by the coupling mechanism 11 and, in particular by the connection mechanisms thereof, such as the bolts 11 in the exemplary embodiment.

In the next step, a hydraulic pressure is introduced on an actuator 8 in such a way that the rotor shaft 2 shall be pressed out from the structure 3 against the press fit. In this case, the actuator 8 presses the rotor shaft 2 toward the left according to FIG. 1, while simultaneously, the coupling mechanism 11, 12 introduces a reaction force that is directed to the right according to FIG. 1 onto the structure 3. At the same time, the structure 3 is heated in a region 7 of the press fit by means of induction by the induction devices 6 integrated into the tool parts 5, 4. As soon as the structure 3 is sufficiently heated in the region 7 of the press fit and has expanded radially there, the rotor shaft 2 pops out from the structure 3. Unnecessary cooling times can be avoided by this method, so that the method according to the invention can be conducted more rapidly in comparison to the prior art.

Since the induction heat can be conducted in a targeted manner into the structure 3 in the region 7 of the press fit by the integrated induction devices 6, any damage both to the structure 3 and also to the rotor shaft 2 can be avoided.

Although exemplary embodiments were explained in the preceding description, it shall be noted that a plurality of modifications is possible. In addition, it shall be noted that the exemplary embodiments only involve examples that in no way shall limit the scope of protection, the applications and the construction. Rather, a guide is given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

What is claimed is:

1. A hydraulic extrusion tool for extruding a rotor shaft for a turbomachine, comprising
    the turbomachine including a structure that is fastened to the rotor shaft by a press fit,
    a first tool part that is arranged on a first side of the structure, and has a coupling mechanism that couples the first tool part to the structure in such a way that the first tool part and the structure cannot move relative to each other, at least in one direction along an axis of the rotor shaft; and
    at least one induction device that is configured for the purpose of heating the structure by induction in the region of the press fit;
    wherein the first tool part has a hydraulic actuator that is configured for the purpose of pushing or pulling the rotor shaft out from the structure against the press fit, when an assembled state is present in which the first tool part is coupled to the structure,
    wherein the at least one induction device is integrated in the first tool part, and
    wherein a second tool part that is arranged on a second side of the structure, the second side being opposite to the first side; wherein a second induction device is integrated in the second tool part.

2. The hydraulic extrusion tool according to claim 1, wherein the coupling mechanism has three or more connection mechanisms and a ring, wherein the ring is arranged on the second side of the structure, and the connection mechanisms are coupled to the first tool part and, when the assembled state is present, enter into complementary openings that are formed in the ring.

3. The hydraulic extrusion tool according to claim 1, wherein the first tool part is configured for the purpose of being arranged at the structure, so that a plane is present that is perpendicular to the axis of the rotor shaft and intersects both the region of the press fit and the first tool part.

4. The hydraulic extrusion tool according to claim 1, wherein the induction device is configured for the purpose of being positioned radially relative to the axis of the rotor shaft outside the region of the press fit, when the assembled state is present, so that a plane is present that is perpendicular to the axis of the rotor shaft and intersects both the region of the press fit and the induction device.

5. The hydraulic extrusion tool according to claim 1, wherein the first and/or the second tool part each have cylindrical sections in which a respective induction device is arranged.

* * * * *